No. 739,951. PATENTED SEPT. 29, 1903.
E. D. VAN AUKEN.
SNAPPING ROLL FOR CORN HARVESTERS.
APPLICATION FILED MAY 12, 1903.
NO MODEL.
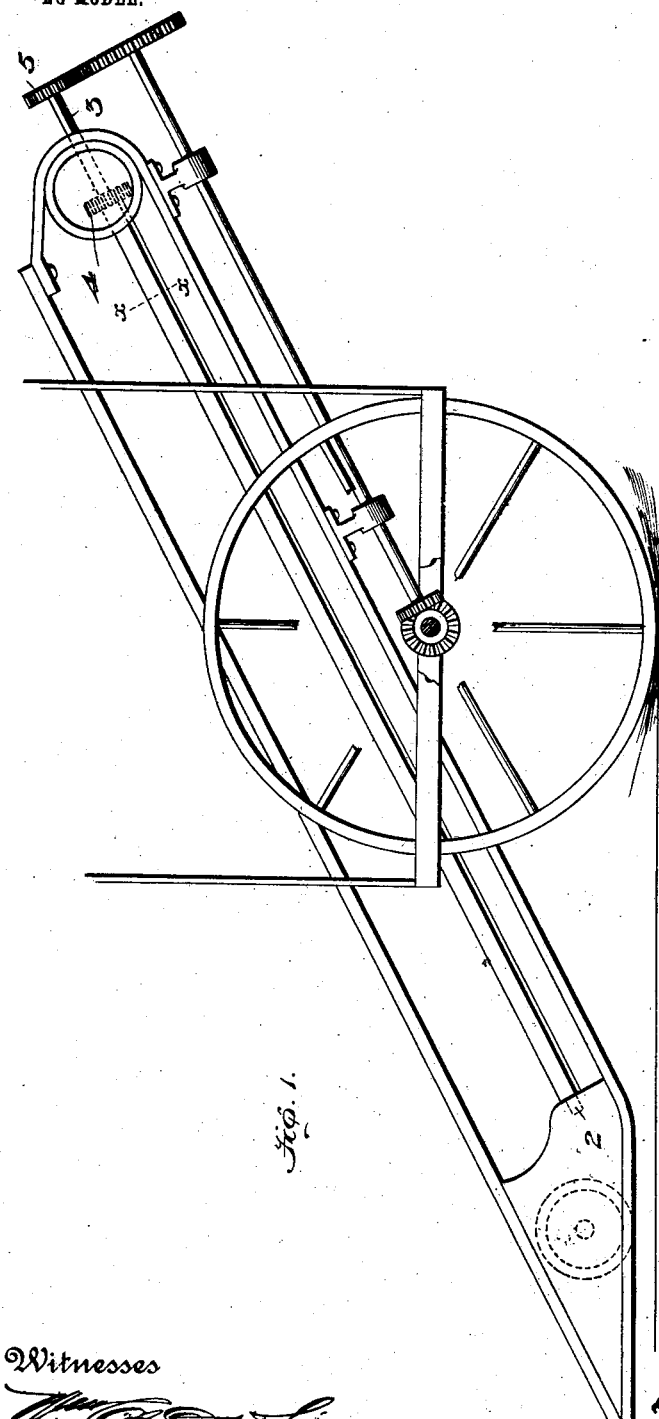
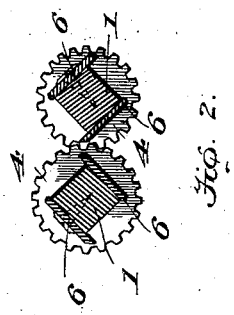
Witnesses
Inventor
Eugene D. Van Auken
by Henry N. Copp
Attorney No. 739,951. Patented September 29, 1903.

UNITED STATES PATENT OFFICE.

EUGENE D. VAN AUKEN, OF SALIX, IOWA.

SNAPPING-ROLL FOR CORN-HARVESTERS.

SPECIFICATION forming part of Letters Patent No. 739,951, dated September 29, 1903.

Application filed May 13, 1903. Serial No. 156,887. (No model.)

*To all whom it may concern:*

Be it known that I, EUGENE D. VAN AUKEN, a citizen of the United States, residing at Salix, county of Woodbury, and State of Iowa, have invented certain new and useful Improvements in Snapping-Rolls for Corn-Harvesters, of which the following is a specification.

My invention relates to snapping-rolls for corn-harvesters wherein a pair of substantially parallel inclined rolls are driven on each side of the row of corn to be harvested and as the rolls rotate snap the ears from the stalk.

The object of the invention is to provide rolls which will be easily interchangeable for other rolls, as dull blades are used when harvesting dry corn and sharpened blades are used when green or young corn is being harvested.

A further object is to provide rolls which will snap the ears cleanly from the stalk without stripping the blades and otherwise mutilating and mangling the stalk, as is so common in most machines of this class.

With these objects in view the invention consists in the combination of parts and novel features, which will be more fully described hereinafter and pointed out in the appended claims.

In the accompanying drawings, Figure 1 is a perspective view of two rolls as they would be positioned on a machine. Fig. 2 is a cross-section taken on line *x x* of Fig. 1.

Referring more especially to the drawings, 1 represents the body of the roll, which is substantially square in cross-section and is of relatively great length. At one end the roll is provided with a reduced portion 2, adapted to journal in the lower part of the machine. At the opposite end the roll has a much longer reduced portion 3, which carries the gears 4 and 5, the former of which is adapted to mesh with a similar gear on the opposite roll, so that both rolls will turn in unison. The latter gear 5, one of which is on each roll and adapted to mesh with each other, receives motion from a counter-shaft geared to the driving-shaft of the harvester. In the intermediate portion between the gears 4 and 5 the reduced portion 3 is adapted to seat in a journal-box secured to the machine, but not shown.

Secured to the side of the roll along its entire squared portion are two knives 6, which are adapted to cut or snap the corn from the stalk as it passes between the rolls. These knives may be rigidly secured to the body 1 of the roll or they may be removably secured, as shown in Fig. 2, which is preferable, as when harvesting dry corn a dull or squared blade is used and when harvesting green or young corn a sharpened blade is needed. The rolls are made interchangeable, so that should one become worn more than the opposite one they could be exchanged and used on opposite sides.

Having thus described my invention, what I claim as new, and desire to secure by Letters Patent, is—

1. A snapping-roll for harvesters having a polygonal body and blades projecting from the sides thereof.

2. A snapping-roll for harvesters having a polygonal body and blades projecting from said body.

3. A snapping-roll for harvesters having a polygonal body and elongated blades removably secured thereto.

4. A snapping-roll for harvesters having a polygonal body and blades secured to certain sides thereof.

5. A snapping-roll for harvesters having a polygonal body and snapping members secured to opposite sides thereof.

6. A snapping-roll for harvesters having a polygonal body and snapping members removably secured to certain sides thereof.

7. A snapping-roll for harvesters having a polygonal body and snapping members projecting from said body, said members being removably secured to the body.

In testimony whereof I hereunto affix my signature in presence of two witnesses.

EUGENE D. VAN AUKEN.

Witnesses:
H. C. FEDDERSEN,
J. F. FEDDERSEN.